United States Patent
Wang

(10) Patent No.: US 8,438,213 B2
(45) Date of Patent: May 7, 2013

(54) PRESENCE SYSTEM AND METHOD FOR THE TELEPHONE STATUS INFORMATION

(75) Inventor: Meng Wang, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 1513 days.

(21) Appl. No.: 11/544,782

(22) Filed: Oct. 6, 2006

(65) Prior Publication Data

US 2008/0219425 A1    Sep. 11, 2008

Related U.S. Application Data

(63) Continuation of application No. PCT/CN2004/000977, filed on Aug. 23, 2004.

(30) Foreign Application Priority Data

Dec. 16, 2003   (CN) .......................... 2003 1 0123638

(51) Int. Cl.
*G06F 15/16*   (2006.01)

(52) U.S. Cl.
USPC ............................. 709/203; 709/201; 709/204

(58) Field of Classification Search ................. 709/201, 709/204; 379/204.1
See application file for complete search history.

(56) References Cited

U.S. PATENT DOCUMENTS

| | | | |
|---|---|---|---|
| 5,023,906 A | 6/1991 | Novas | 379/377 |
| 5,140,631 A | 8/1992 | Stahl | 379/377 |
| 6,076,093 A * | 6/2000 | Pickering | 1/1 |
| 6,160,872 A * | 12/2000 | Karnowski et al. | 379/93.09 |
| 7,129,818 B1 * | 10/2006 | Begole et al. | 340/286.02 |
| 7,260,201 B2 * | 8/2007 | Jorasch et al. | 379/207.04 |
| 2002/0076010 A1 | 6/2002 | Sahai | |
| 2003/0012185 A1 * | 1/2003 | Riemann et al. | 370/352 |
| 2003/0069934 A1 | 4/2003 | Garcia-Martin et al. | |
| 2004/0062838 A1 * | 4/2004 | Castellanos et al. | 426/106 |
| 2007/0192410 A1 * | 8/2007 | Liversidge et al. | 709/204 |

FOREIGN PATENT DOCUMENTS

| | | |
|---|---|---|
| EP | 0 185 295 | 6/1986 |
| WO | WO 99/08434 | 2/1999 |
| WO | WO-99/08434 A1 | 2/1999 |
| WO | WO-02/043351 | 5/2002 |
| WO | WO-02/065250 | 8/2002 |
| WO | WO 03/077517 | 9/2003 |

* cited by examiner

*Primary Examiner* — Djenane Bayard

(74) *Attorney, Agent, or Firm* — Marshall, Gerstein & Borun LLP

(57) ABSTRACT

A system for presenting telephone state information includes a presence server 10; a presence client end 20 and a presence contact end 30 which are respectively connected with the presence server 10 and communicate with each other through the presence server 10; a user telephone line monitoring device 40, used for monitoring the state of the user telephone line 50, and sending the monitored state to the presence client end 20. Wherein, the presence contact end 30 is used for displaying presence information of a corresponding telephone state of the presence client end 20 it subscribed. The present invention also provides a method for presenting telephone state information. Through the invention, a client can inform his/her telephone state information to the contacts in time. The system and method do not depend on special telephone switch, and have a low cost, can be used in any area.

11 Claims, 4 Drawing Sheets

PRESENCE SYSTEM AND METHOD FOR THE TELEPHONE STATUS INFORMATION

FIELD OF THE TECHNOLOGY

The present invention relates to network communication technologies, and more particularly, to a system and a method for presenting telephone state information.

BACKGROUND OF THE INVENTION

Presence service refers to a service that makes the state of a service presence client visible to a selected presence contact, so as to make it possible for the contact to choose appropriate communication means, time and communication service of his/her own. Presence information refers to the current state of a presence client, including online/offline, busy/idle, etc. The state, e.g., online or offline, can be obtained through detecting a network connection between a presence server and a presence client end. The state can also be configured by a client who uses the presence client end, e.g., be configured to be in a meeting, etc. The state still can be obtained through detection by a presence client end software. For example, if the client end software has not detected any information inputted by the client for a period of time, it sets the presence information of the client as leaving. A Presence contact refers to a presence client who has subscribed presence information of another presence client. For the presence client whose presence information has been subscribed by other presence client, the other presence client is called a "contact". The presence service has been integrated into various Instant Messaging (IM) software programs.

As shown in FIG. 1, a conceptive model of a presence system includes three components: a presence server, a presence client end and a presence contact end. The presence server includes a hardware device and software for providing a presence service. The presence client end includes a terminal equipment and software used to log in the presence system for a presence client. The presence contact end includes a terminal and a software program, used to log in the presence system for a presence contact. It should be noted that, to make the description convenient, the presence client end and the presence contact end are described separately. Whereas in practical presence services, the presence client and the presence contact tend to be contacts to each other, and they run the same software program.

Before obtaining the presence information of a presence client, a presence contact must subscribe for the presence information of the presence client from the presence server. The presence server adds the presence client to a presence information subscription list of the presence contact after authentication. When the state of the presence client changes, the presence server can obtain the state information of the presence client through various methods, including:

1) monitoring a communication interface between the presence server and the presence client end by the presence server, e.g., monitoring whether the presence client has logged on the client end software, etc.;

2) configured by the presence client his/her own, e.g., configured to be in a meeting, and reported to the presence server by the presence client;

3) monitored by the presence client, e.g., if the client software has not detected any input from the presence client for a period of time, the client end software configures the presence information of the presence client as leaving, and reports the state information to the presence server through the presence client end.

Upon detecting the change of the presence state of the presence client, the presence server distributes presence information to the presence contact who has subscribed for the presence information of the presence client. Upon receiving the presence information, the presence contact end correspondingly changes the presence information of the presence client displayed on a terminal interface, e.g., changes the presence information from "online" to "busy".

Through the above mentioned techniques, in the current presence system, a client can make it convenient for his/her contact to see various state information configured by the client or detected by a computer. So that the contact can arrange communication manner and communication time according to the state information.

Whereas, traditional telephone still plays a very important part in people's everyday life and work, and it is a main communication means for people. A telephone client also expects to let his/her telephone state information known by his/her contact, therefore the contact can choose a corresponding communication mode and time according to the telephone state of the client when calling the client. Thus, the contact may not call the client when the client is busy according to the telephone state of the client.

If the presence system does not have the ability of providing telephone state information, a presence contact cannot know the telephone state of a presence client. Thus, when needs to call the client, the contact often encounters a busy telephone line. If the contact does not know when the client's telephone will be idle, he can only dial for many times, which wastes a lot of time and energy.

To solve this problem, a solution on basis of a telephone switch is proposed to implement the presence service of the telephone state information. As shown in FIG. 2, the solution is implemented through modifying the program of the telephone switch. Upon detecting a change on the telephone state, the telephone switch sends a notification of telephone state change information to the presence server. And the corresponding presence server has been configured with data related to the telephone state information. Upon receiving the notification of the telephone state change information, the presence server looks for the presence client information corresponding to the telephone number, modifies the presence information related to the telephone state, and distributes the telephone state change information to the contact who has subscribed for the presence information of the client.

Whereas, the solution has the following problems:

1) the cost is high.

In this solution, the program of the telephone switch needs to be modified, that is to say, to implement a presence service of the telephone state information, a large scale telephone switch reconstructions must be performed by telecommunication operators or vendors.

2) the solution depends on the ability of a telephone switch

The reconstruction of the switch cannot be implemented in a short time, so that a client can only enjoy the service in an area where the reconstruction is finished, once leaving the area, the client cannot use the service any more, i.e., the client cannot present the telephone state to his/her contact.

BRIEF DESCRIPTION OF THE INVENTION

The present invention provides a system and a method for presenting telephone state information, so as to implement a telephone state presence service which is independent of a telephone switch; therefore there is no need to reconstruct the telephone switch, which brought out a lower cost.

The present invention provides a system for presenting telephone state information, including: a presence server 10; a presence client end 20; a presence contact end 30; a user telephone line monitoring device 40; wherein, the presence client end 20 and the presence contact end 30 are respectively connected with the presence server 10, and communicate with each other through the presence server 10; the presence contact end 30 is used for displaying presence information of a corresponding telephone state of the presence client end 20 subscribed by the presence contact end 30; the user telephone line monitoring device 40, connected between a user telephone line 50 and the presence client end 20, includes: a telephone interface 41; a monitoring device 42; a state signal processing device 43; a monitoring interface 44; wherein, the telephone interface 41, the monitoring device 42, the state signal processing device 43 and the monitoring interface 44 are serially connected; the monitoring device 42 is used for monitoring the state of the user telephone line connected with the telephone interface 41 and sending the monitored state to the state signal processing device 43; the state signal processing device 43 is used for analyzing the state sent by the monitoring device 42 and generating corresponding telephone state information, sending the generated telephone state information to the presence client end 20 connected with the monitoring interface 44 via the monitoring interface 44.

Wherein, the presence server 10 includes: a state information database 12; a presence information subscription database 13; an information processing device 11; a communication interface 14; wherein, the state information database 12 is used for storing telephone state information of the presence client end 20; the presence information subscription database 13 is used for storing a presence information subscription relationship between the presence client end 20 and the presence contact end 30; and the information processing device 11 is connected with the communication interface 14, the state information database 12 and the presence information subscription database 13, used for receiving telephone state information from the presence client end 20 via the communication interface 14, updating the telephone state information in the state information database 12, searching for a corresponding presence contact end 30 according to the presence information subscription database 13, and distributing the telephone state information to the found presence contact end 30 via the communication interface 14.

Wherein, the state information database 12 and the presence information subscription database 13 are one database physically.

Wherein, the presence client end 20 includes: a monitoring information processing device 23; a monitoring interface 21; a communication interface 22; wherein, the monitoring information processing device 23 is connected with the monitoring interface 21, the communication interface 22 respectively, used for receiving telephone state information from the user telephone line monitoring device 40, and sending the received telephone state information to the presence server 10 via the communication interface 22.

Wherein, the presence contact end 30 includes: a communication interface 31; a presence information processing device 32; wherein, the presence information processing device 32 is connected with the communication interface 31, used for receiving telephone state information from the presence server 10 via the communication interface 31 and displaying the presence information of the telephone state information.

Wherein, the presence server 10, the presence client end 20 and the presence contact end 30 further include modules for implementing an Instant Messaging (IM) function.

The present invention provides a method for presenting telephone state information, including: a user telephone line monitoring device monitoring the state of a user telephone line, generating corresponding telephone state information according to the current state, and sending the generated telephone state information to a presence client end; the presence client end receiving the telephone state information, and sending the received telephone state information to a presence server; the presence server receiving the telephone state information, and sending the received telephone state information to a presence contact end that has subscribed for the telephone state information; the presence contact end receiving the telephone state information, and displaying presence information of the telephone state information.

Wherein, before generating corresponding telephone state information according to the current state, the method further includes: the user telephone line monitoring device determining whether the state of the user telephone line has changed, if the state of the user telephone line has changed, proceeding to the following steps; otherwise, returning to the step of monitoring the state of the user telephone line.

Wherein, the state of the user telephone line comprises an electronic feature of the user telephone line.

Therefore, a presence client can transmit his/her telephone state information to his/her contact, when a contact initiates a call to him/her, a corresponding communication mode and time can be chose to save time and energy.

In addition, the user telephone line monitoring device connected with the user telephone line does not depend on the telephone switch. Compared with the reconstruction of the telephone switch, the cost can be greatly reduced. Besides, since the monitoring of the user line does not depends on the telephone switch, the problem that the client cannot use the presence service once he/she leaves the reconstructed area can be solved. The present invention can be applied in any area whether it has been reconstructed or not.

DETAILED DESCRIPTION OF THE INVENTION

The present invention will be described in detail hereinafter with reference to accompanying drawings and embodiments of the present invention.

Figure 1:
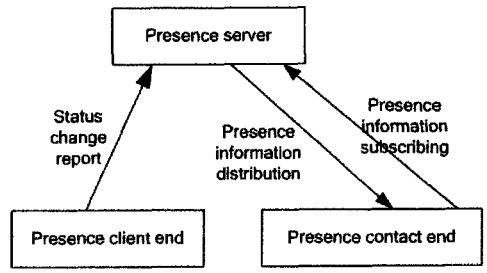
FIG. 1 is a schematic diagram illustrating a conceptive model of a presence service.
Figure 2:
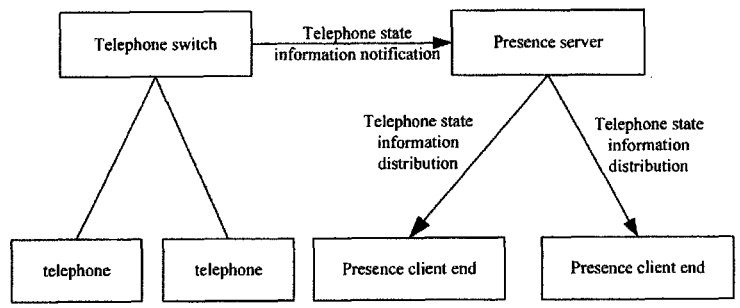
FIG. 2 is a diagram illustrating a structure of a system for presenting telephone state information according to the related art.
Figure 3:
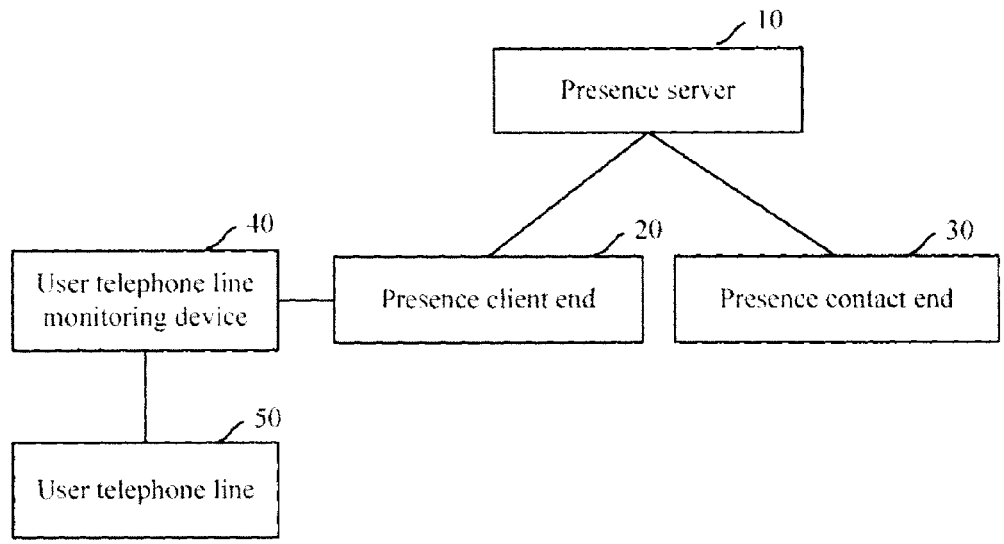
FIG. 3 is a diagram illustrating a structure of a system for presenting telephone state information in accordance with an embodiment of the present invention.

Referring to FIG. 3, a system for presenting telephone state information in accordance with an embodiment of the present invention includes: a presence server 10, connected with a presence client end 20 and a presence contact end 30 respectively, and implements interconnection for the presence client end 20 and the presence contact end 30; the presence client end 20; the presence contact end 30; a user telephone line monitoring device 40, connected with the presence client end 20, and provides telephone state information for the presence client end 20; and a user telephone line 50, refers to a user line provided by a telephone switch for accessing the telephone, connected with the user telephone line monitoring device 40, and its state is monitored by the user telephone line monitoring device 40.

Figure 4:
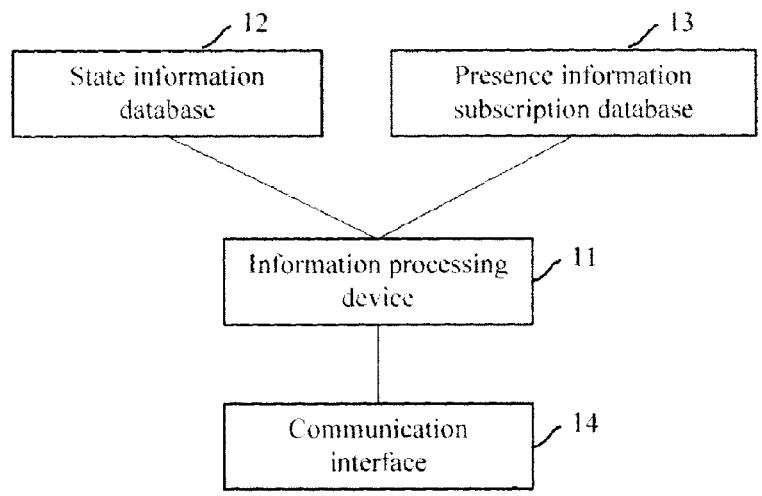
FIG. 4 is a diagram illustrating a structure of a presence server

Referring to FIG. 4 at the same time, the presence server 10 includes: an information processing device 11; a state information database 12, used for storing user telephone state information; a presence information subscription database 13, used for storing a presence information subscription relationship between the presence client end 20 and the presence contact end 30; and a communication interface 14, connected with the presence client end 20 and the presence contact end 30.

The information processing device 11 is used for performing the following tasks: receiving state information of a monitored telephone from the presence client end 20 via the communication interface 14; searching, modifying or storing telephone state information corresponding to a client logging in the presence client end 20 in the state information database 12; searching the presence information subscription database 13 for a contact corresponding to the client logging in the presence client end 20; storing a subscription relationship in the presence information subscription database 13; distributing telephone state information to the presence contact end 30 which has subscribed the telephone state information of the client via the communication interface 14.

The state information database 12 can be implemented by relation database technology. Relation database software can be installed in the presence server 10, and an Application Programming Interface (API) provided by a relation database manufacture can be adopted as well. Generally, a Structured Query Language (SQL) is adopted as an interface program to manage the contents of the database in the relation database. The following contents shown in Table 1 are stored in the state information database 12:

TABLE 1

| Client | Telephone state |
|--------|-----------------|
| John   | Idle            |
| Mike   | Busy            |
| ...    | ...             |

Similarly, the same relation database technology, the same API and the same SQL which are adopted by the state information database 12 can also be adopted by the presence information subscription database 13, the following contents shown in Table 2 are stored in the presence information subscription database 13:

TABLE 2

| Client | Contact |
|--------|---------|
| John   | Mike    |
| John   | Tom     |
| ...    | ...     |

The state information database 12 and the presence information subscription database 13 can be combined into one database, adopting the same API and the same SQL, the following contents shown in Table 3 are saved in the combined database:

TABLE 3

| Client | Telephone state | Contact |
|--------|-----------------|---------|
| John   | Idle            | Mike    |
|        |                 | Tom     |
| Mike   | Busy            |         |
| ...    | ...             |         |

Figure 5:
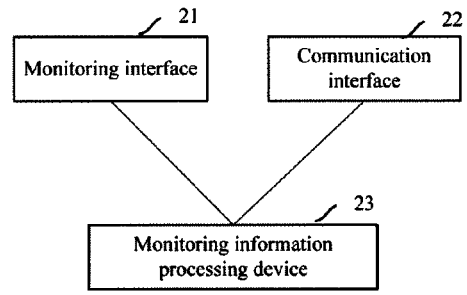
FIG. 5 is a diagram illustrating a structure of a presence client end

Referring to FIG. 5 at the same time, the presence client end 20 refers to a terminal and software running in the terminal providing presence terminal functions for a presence client.

The presence client end 20 includes: a monitoring interface 21, connected with the user telephone line monitoring device 40, used for receiving telephone state information from the user telephone line monitoring device 40; a monitoring information processing device 23, used for processing telephone state information received from the user telephone line monitoring device 40, it receives telephone state information via the monitoring interface 21, and transmits the received telephone state information to the presence server 10 via a communication interface 22; and the communication interface 22, connected with the presence server 10.

Figure 6:
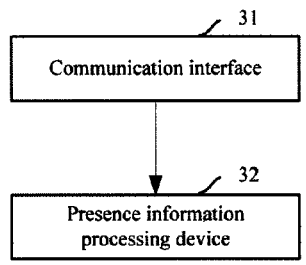
FIG. 6 is a diagram illustrating a structure of a presence contact end.

Referring to FIG. 6 along with all the other Figures, the presence contact end 30 refers to a terminal and software running in the terminal providing presence terminal functions for one or more contacts of a presence client. The presence contact end includes: a communication interface 31, connected with the presence server 10; and a presence information processing device 32, used for receiving telephone state information related to the presence client end 20 from the presence server 10, displaying the telephone state information on a terminal interface provided by the client.

Wherein, the communication interfaces 14, 22, 31 between the presence server 10 and the presence client end 20 and the presence contact end 30 generally adopt interfaces on basis of an Internet Protocol (IP) network, and have their respective IP address. The presence server 10 opens a service interface based on Transmission Control Protocol (TCP) or User Datagram Protocol (UDP). The presence client end 20 and the presence contact end 30 are connected to the service interface provided by the presence server 10 through the corresponding TCP or UDP, and establish connections with the presence server 10 after a necessary authentication. After the establishment of the connections, the presence server 10 can send data to and receive data from the presence client end 20 or the presence contact end 30 via the corresponding connection. The detailed implementation of this type of IP-based communication interface belongs to existing technologies in the computer network communication field, which will not be described herein.

In practical applications, a client end is usually required to have the function of the presence client end 20 and that of the presence contact end 30 simultaneously, i.e., the client subscribes a presence service and being subscribed by other clients at the same time. The client not only receives his/her described presence information, but also sends presence information to the presence server 10, and then the presence server 10 forwards the presence information to other subscribers. In addition, the presence client end 20 and the presence contact end 30 can be computers, Personal Digital Assistants (PDAs), mobile phones or other devices. Computer is taken as an example in a preferable embodiment of the present invention.

Other modules also can be added to the presence server 10, the presence client end 20 and the presence contact end 30 according to practical requirements. For example, when used for Instant Messaging (IM) services, modules for implementing an IM function can be added.

Figure 7:
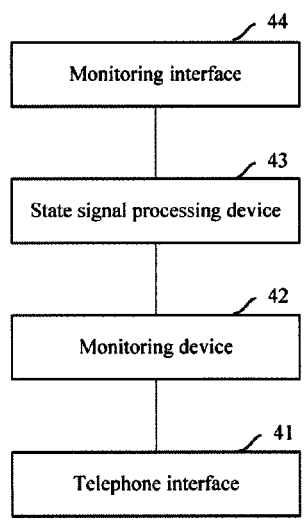
FIG. 7 is a diagram illustrating a structure of a user telephone line monitoring device.

Referring to FIG. 7 at the same time, the user telephone line monitoring device 40 refers to an electronic device connected with the telephone line, it includes: a telephone interface 41, connected with the user telephone line 50; a monitoring device 42, used for monitoring the state of the user telephone line; a state signal processing device 43, used for processing the telephone signal monitored by the monitoring device 42; and a monitoring interface 44, connected with the presence client end 20.

The state signal processing device 43 determines the type of the change of the user telephone line state monitored by the monitoring device 42, generates telephone state information, and sends the telephone state information to the presence client end 20 through the communication interface 22 between the presence client end 20 and the state signal processing device 43.

The monitoring interfaces 21, 44 between the presence client end 20 and the user telephone line monitoring device 40 can be implemented on basis of computer interface technologies. When the user telephone line monitoring device 40 is a separate device outside the presence client end 20, the interfaces 21, 44 can be a wireline interface, such as Universal Serial Bus (USB) interface, parallel interface, serial interface, 1394 interface, or can be a wireless interface, such as infrared, Bluetooth, Wireless Local Area Network (WLAN), etc. When the user telephone line monitoring device 40 is a module (e.g. an inserted card) inside the presence client end 20, the interfaces 21, 44 can be a computer bus interfaces, such as Industry Standard Architecture (ISA) interfaces, Peripheral Computer Interconnect (PCI) interfaces, or can be other interfaces on computer, such as USB interfaces, parallel interfaces, serial interfaces, etc. Besides the interfaces between the presence client end 20 and the user telephone line monitoring device 40, corresponding drivers are required to implement communication through the interfaces. The implementation of the interfaces and their drivers are existing technologies in the computer field, there are a large number of practical product applications and hardware components, which will not be described herein. Through the interfaces between the presence client end 20 and the user telephone line monitoring device 40 and the drivers of the interfaces, the presence client end 20 and the user telephone line monitoring device 40 can communicate with each other, thereby implementing transmission and reception of the user telephone line state change signal.

The user telephone line monitoring device 40 has the telephone interface 41 connected with the user telephone line 50. The telephone interface 41 can be a RJ11 interface. Through the telephone interface 41, the user telephone line monitoring device 40 is connected to the user telephone line 50.

The user telephone line monitoring device has a function of monitoring the state of the user telephone line 50. The principle is that, the electronic feature of the user telephone line 50 is different under different states. Therefore, the user telephone line monitoring device 40 can determine the state of the user telephone line 50. Taking the telecommunication network in China based on a digital program controlled switch as an example, corresponding relationships between the states and the electronic features of a user telephone line include:

(1) Idle i.e. a state without an incoming call or an outgoing call and the telephone being hang on normally. In a common telephone system, a switch provides approximate 48V direct current for a user telephone line in the idle state, and the current is less than 5 µA.

(2) Calling i.e., a state when the user initiates a call or receives a call. In a common telephone system, a telephone switch provides a direct current of approximate 10 to 20V for a user telephone line in the calling state. And an audio signal, behaves as a large fluctuating current, is added on the voltage.

(3) Connected

To meet the requirement of a charging telephone, such as a public coin telephone, a modern telephone switch may provide a "connected" state for a user telephone line.

A polarity reversal signal is a charging signal provided by a switch, when a call is connected and the called party picks up the phone, the positive and the negative polarities in the user telephone line are reversed.

In addition, an electronic line with a more powerful function is developed to monitor various states as follows:

(4) Dialling

When a user picks up the phone, the switch will send a dialling indication tone of a certain frequency to the phone of the user, indicating the user to input a telephone number.

(5) Ringing Back

After the user finishes inputting the telephone number, the switch will send a ringing back tone with a certain frequency and interval to the calling party when ringing the called party.

(6) Ringing

When a user is called, an alternating current signal with tens of volts is added to the user telephone line, then the telephone is ringing.

According to the above mentioned different electronic features of a user telephone line in different states, an electronic device for monitoring the state of a user telephone line can be developed. This kind of electronic devices is popularly applied and have a lot of products, e.g., SS173K222AL produced by the TDK company, it is a highly integrated Single Chip Machine (SCM) programming MODEM chip, and possesses functions of call procedure, carrier, response tone and long loop detection; it can also generate Double Tone Multiple Frequency (DTMF) signals by programming. The SS173K222AL chip has four 8-bit registers for monitor, which are CR0, CR1, DR, TR. Wherein, the DR is used for monitoring working state. And the current state of the user telephone line can be obtained by monitoring the content of the DR Register.

An implementation based on a USB interface in accordance with an embodiment of the present invention is given hereinafter:

The user telephone line monitoring device 40 is a device with three interfaces, the monitoring interface 44 connected between the user telephone line monitoring device 40 and the presence client end 20 is implemented by a USB interface. Two RJ11 telephone interfaces 41 are set, one of them is connected to a telephone socket connected with the switch, and the other is connected to the telephone. Inside the user telephone line monitoring device 40, the above mentioned SS173K222AL chip is adopted to implement an SCM-based control program, the monitoring device 42 and the state signal information processing device 43 which are based on telephone chips. When a presence client uses the telephone, the DR register in the SS173K222AL chip changes, and sends an interrupt to the SS173K222AL chip. And the SS173K222AL chip drives the USB interface 44 to send a data packet of a user telephone line change notification to the presence client end 20.

Correspondingly, based on the telephone state information presence system in accordance with the embodiments of the present invention, an implementation method for providing telephone state information is also provided, the process of a presence client providing telephone state information for his/her contacts includes the following steps:

(1) the electronic feature of the user telephone line 50 changes;

(2) the user telephone line monitoring device 40 detects the change of the electronic feature of the user telephone line 50, e.g., a change from a electronic feature corresponding to the "idle" state to that corresponding to the "connected" state;

(3) the user telephone line monitoring device 40 generates corresponding telephone state information, e.g., "state=calling", according to the current electronic feature of the user telephone line 50;

(4) the user telephone line monitoring device 40 sends the generated telephone state information to the presence client end 20 via the communication interfaces 44, 21 connected between the user telephone line monitoring device 40 and the presence client end 20;

(5) upon receiving the telephone state information, the presence client end 20 sends the received telephone state information to the presence server 10 via the communication interfaces 22, 14 connected between the presence client end 20 and the presence server 10;

(6) upon receiving the telephone state information, the presence server 10 searches the state information database 12 for the telephone state information corresponding to the client logging on the presence client end 20, if the telephone state information of the client logging on the presence client end 20 is existed, modify or update the telephone state information of the client logging on the presence client end 20, otherwise, store the telephone state information of the client logging on the presence client end 20 in the state information database; at the same time, search the presence information subscription database 13 for the contact who has subscribed the presence information and logged on the presence contact end 30;

(7) the presence server 10 distributes the telephone state information to the discovered one or more contacts via the communication interfaces 14, 31 connected between the presence server and the presence contact end 30.

Figure 8:
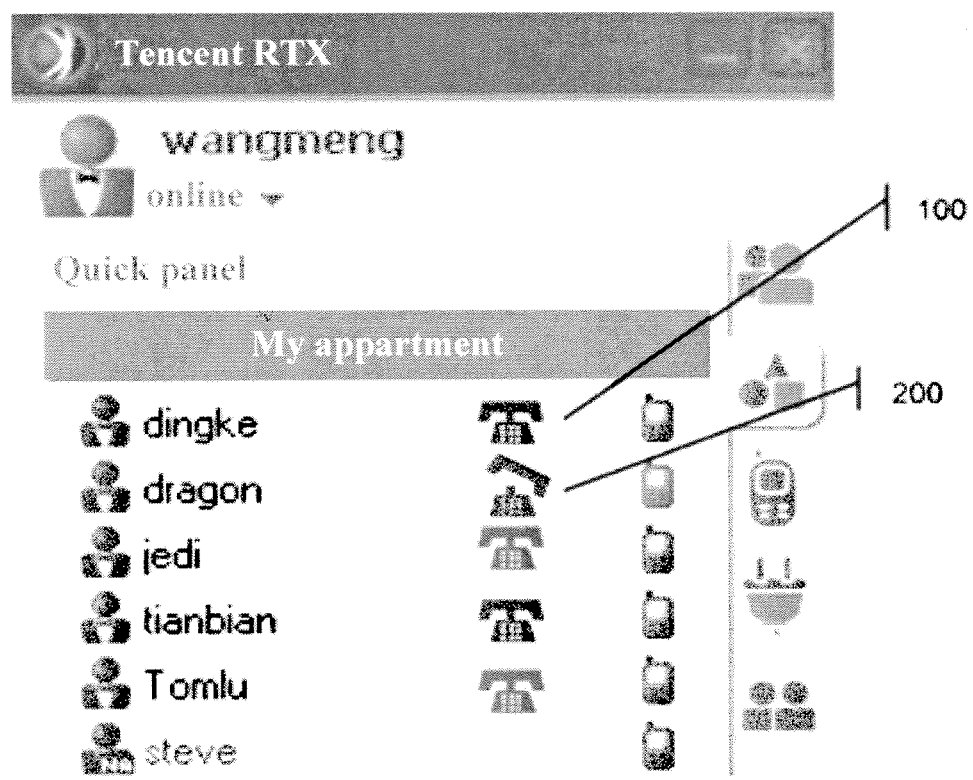
FIG. 8 is diagram illustrating a presence effect of a presence client end in accordance with an embodiment of the present invention.

(8) upon receiving the telephone state information, the presence contact end 30 displays the telephone state information on a terminal interface; Wherein, various presence state information can be expressed with different icons or colours for the presence information shown in FIG. 8, the icon marked with 100 expresses that the telephone is in a idle state, the icon marked with 200 expressed that the telephone is in a "connected" state. And the icon marked with 100 can be coloured with blue, while the icon marked with 200 can be coloured with red.

What is claimed is:

1. A method for presenting telephone state information, comprising:
    monitoring, by a user telephone line monitoring device, the state of a user telephone line of a first user, generating telephone state information according to a current state of the user telephone line, and sending the generated telephone state information to a presence client end of the first user;
    receiving, by the presence client end of the first user, the telephone state information, and sending the received telephone state information to a presence server via an IP network;
    receiving, by the presence server, the telephone state information, and sending the received telephone state information to a presence contact end of a second user that has subscribed the telephone state information of the first user; and
    receiving, by the presence contact end, the telephone state information, and displaying presence information of the telephone state information;
    wherein the monitoring the state of the user telephone line comprises monitoring the electronic feature of the user telephone line, wherein the electronic feature of the user telephone line is one of,
    a direct current of 48V with a current less than 5 $\mu A$, indicating the user telephone is in an idle state, which is a state without an incoming call or an outgoing call and the telephone being hang on normally,
    a direct current of approximate 10 to 20V with a fluctuating current, indicating the user telephone is in a calling state, which is a state when the user initiates a call or receives a call,
    a polarity reversal signal, indicating the user telephone is in a connected state, which is a state when a call is connected and the called party picks up the phone, and
    an alternating current signal with tens of volts added to the user telephone line, indicating the user telephone is in a ringing state, which is a state when the user is called; and
    wherein the user telephone line monitoring device comprises two telephone interfaces, wherein one of the two telephone interfaces is connected to a telephone socket connecting with a switch, and the other of the two telephone interfaces is connected to the monitored telephone;
    the monitoring device is to obtain the current state of the user telephone line by monitoring the content of a register in the monitoring device, wherein the register is to monitor the working state; and
    wherein the content of the register in the monitoring device is to change when a user uses a telephone connected with the user telephone line; and
    the state signal processing device is to generate a user telephone line change notification according to the change of the register and send the user telephone line change notification via the monitoring interface to the presence client end.

2. The method according to claim 1, further comprising:
    determining, by the user telephone line monitoring device before generating corresponding telephone state information according to current state, whether the state of the user telephone line has changed, if the state of the user telephone line has changed, proceeding to the following steps; otherwise, returning to the step of monitoring the state of the user telephone line.

3. The method according to claim 1, wherein, the step of displaying the telephone state information comprises:
    displaying different telephone state information by different icons and/or colours.

4. A system for presenting telephone state information, the system comprising:
    a presence server;
    a presence client end of a first user;
    a presence contact end of a second user; and
    a user telephone line monitoring device; wherein, the user telephone line monitoring device, connected between a user telephone line of the first user and the presence client end, comprises a telephone interface, a monitoring device, a state signal processing device, a monitoring interface, wherein, the telephone interface, the monitoring device, the state signal processing device and the monitoring interface are serially connected, the monitoring device is used for monitoring the state of the user telephone line connected with the telephone interface and sending the monitored state to the state signal processing device, the state signal processing device is used for analyzing the state sent by the monitoring device and generating telephone state information of the first user, sending the generated telephone state information to the presence client end connected with the monitoring interface via the monitoring interface, the presence client end of the first user is used for sending the telephone state information of the first user to the presence server via an IP network, and the presence contact end is used for displaying presence information of a telephone state of the first user provided by the presence server;

wherein the monitoring device is used for monitoring the state of the user telephone line by monitoring the electronic feature of the user telephone line and for performing at least one of, determining, when the electronic feature of the user telephone line is a direct current of 48V with a current less than 5 μA, the monitored state of the user telephone is an idle state which is a state without an incoming call or an outgoing call and the telephone being hang on normally, determining, when the electronic feature of the user telephone line is a direct current of approximate 10 to 20V with a fluctuating current, the monitored state of the user telephone is a calling state which is a state when the user initiates a call or receives a call, determining, when the electronic feature of the user telephone line is a polarity reversal signal, the monitored state of the user telephone is a connected state which is a state when a call is connected and the called party picks up the phone, and determining, when the electronic feature of the user telephone line is an alternating current signal with tens of volts added to the user telephone line, the monitored state of the user telephone is a ringing state which is a state when the user is called;

wherein the user telephone line monitoring device comprises two telephone interfaces, wherein one of the two telephone interfaces is connected to a telephone socket connecting with a switch, and the other of the two telephone interfaces is connected to the monitored telephone;

the monitoring device is to obtain the current state of the user telephone line by monitoring the content of a register in the monitoring device, wherein the register is to monitor the working state; and wherein the content of the register in the monitoring device is to change when a user uses a telephone connected with the user telephone line; and the state signal processing device is to generate a user telephone line change notification according to the change of the register and send the user telephone line change notification via the monitoring interface to the presence client end.

5. The system according to claim 4, wherein, the presence server comprises:

a state information database;

a presence information subscription database;

an information processing device;

a communication interface; wherein, the state information database is used for storing telephone state information of the presence client end;

the presence information subscription database is used for storing a presence information subscription relationship between the presence client end and the presence contact end; and the information processing device is connected with the communication interface, the state information database and the presence information subscription database, used for receiving telephone state information from the presence client end via the communication interface, updating the telephone state information in the state information database, searching for a corresponding presence contact end according to the presence information subscription database, and distributing the telephone state information to the found presence contact end via the communication interface.

6. The system according to claim 5, wherein, the state information database and the presence information subscription database are one database physically.

7. The system according to claim 4, wherein, the presence client end comprises:

a monitoring information processing device;

a monitoring interface;

a communication interface; wherein, the monitoring information processing device is connected with the monitoring interface, the communication interface respectively, used for receiving telephone state information from the user telephone line monitoring device, and sending the received telephone state information to the presence server via the communication interface.

8. The system according to claim 4, wherein, the presence contact end comprises:

a communication interface;

a presence information processing device; wherein, the presence information processing device is connected with the communication interface, used for receiving telephone state information from the presence server via the communication interface and displaying the presence information of the telephone state information.

9. The system according to claim 4, wherein, the presence server, the presence client end and the presence contact end further comprise modules for implementing an Instant Messaging (IM) function.

10. The system according to claim 4, wherein the monitoring device and the state signal processing device are implemented by a Single Chip Machine, SCM, based control program in an integrated programming Modulator-Demodulator, MODEM, chip.

11. The system according to claim 4, wherein the monitoring interface is implemented by a USB interface; and/or the two telephone interfaces are implemented by RJ11 telephone interfaces; and/or the monitoring device and the state signal processing device are implemented by a SS173K222AL chip.

* * * * *